US011170176B2

(12) United States Patent
Lillelund et al.

(10) Patent No.: US 11,170,176 B2
(45) Date of Patent: Nov. 9, 2021

(54) ARTIFICIAL INTELLIGENCE BASED WORD GENERATION

(71) Applicant: International Business Machines Corporation, Armonk, NY (US)

(72) Inventors: Jan B. Lillelund, Holte (DK); Brian Rasmussen, Hørsholm (DK); Clea Anne Zolotow, Key West, FL (US); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/585,695

(22) Filed: Sep. 27, 2019

(65) Prior Publication Data
US 2021/0097141 A1 Apr. 1, 2021

(51) Int. Cl.
*G06F 17/00* (2019.01)
*G06F 40/30* (2020.01)
*G06N 5/02* (2006.01)

(52) U.S. Cl.
CPC ............. *G06F 40/30* (2020.01); *G06N 5/022* (2013.01)

(58) Field of Classification Search
None
See application file for complete search history.

(56) References Cited

U.S. PATENT DOCUMENTS

| | | | | |
|---|---|---|---|---|
| 8,775,442 B2* | 7/2014 | Moore | ................... | G06F 16/93 |
| | | | | 707/749 |
| 9,230,561 B2* | 1/2016 | Ostermann | .......... | G09B 21/009 |
| 9,292,490 B2* | 3/2016 | Kimelfeld | ............. | G06F 40/205 |
| 9,443,005 B2* | 9/2016 | Khandekar | .......... | G06F 16/3329 |
| 9,536,544 B2* | 1/2017 | Ostermann | ............. | G10L 21/10 |
| 10,360,260 B2* | 7/2019 | Zhu | ........................ | G06F 16/685 |
| 2019/0340245 A1* | 11/2019 | Zhu | ....................... | G06F 40/295 |

FOREIGN PATENT DOCUMENTS

| | | | |
|---|---|---|---|
| CN | 106528858 A | 3/2017 | |
| CN | 109086408 A | 12/2018 | |
| WO | WO-2018232623 A1 * | 12/2018 | ........... G06N 3/0454 |
| WO | WO2018232623 A1 | 12/2018 | |

\* cited by examiner

*Primary Examiner* — Satwant K Singh
(74) *Attorney, Agent, or Firm* — Yee & Associates, P.C.

(57) ABSTRACT

A computer-implemented method includes identifying a theme for a poetic composition. The method also includes building a datastore of text taxonomies that provide associative differences between two words in a plurality of words. The method also includes analyzing the associative differences to determine a distance from a nexus for each of the plurality of words, wherein the nexus is determined according to the theme, and wherein the distance from the nexus to one of the plurality of words describes a suitability of the one of the plurality of words for use in the poetic composition for the theme. The method also includes determining at least one associative word according to the distance from the nexus. The method also includes determining a rhyming word from the plurality of words according to the at least one associative word.

20 Claims, 9 Drawing Sheets

ARTIFICIAL INTELLIGENCE BASED WORD GENERATION

BACKGROUND

1. Field

The disclosure relates generally to computer systems and, more particularly, to computer automated methods for generating words for poetic compositions.

2. Description of the Related Art

In the field of computational creativity, music generation systems analyze existing music written by human composers and, utilizing cognitive technologies, generate novel musical compositions for performance by either human musicians or by computers. For example, IBM Watson Beat is a music generation system that utilizes neural networks to transform a simple melody and a set of parameters for a creativity engine into a fully realized musical composition (IBM is a registered trademark and Watson Beat is a trademark of International Business Machines Corporation). The set of parameters for the creativity engine can include chord progression complexity, time signature, tempo (e.g. in beats per minute), and desired energy level, amongst other things.

SUMMARY

According to one illustrative embodiment, a computer-implemented method includes identifying, by a data processing system a theme for a poetic composition. The method also includes building, by the data processing system, a datastore of text taxonomies that provide associative differences between two words in a plurality of words. The method also includes analyzing, by the data processing system, the associative differences to determine a distance from a nexus for each of the plurality of words, wherein the nexus is determined according to the theme, and wherein the distance from the nexus to one of the plurality of words describes a suitability of the one of the plurality of words for use in the poetic composition for the theme. The method also includes determining, by the data processing system, at least one associative word according to the distance from the nexus. The method also includes determining, by the data processing system, a rhyming word from the plurality of words according to the at least one associative word. According to other illustrative embodiments, a data processing system and computer program product for generating lyrics for a poetic composition are provided.

DETAILED DESCRIPTION

Figure 1:
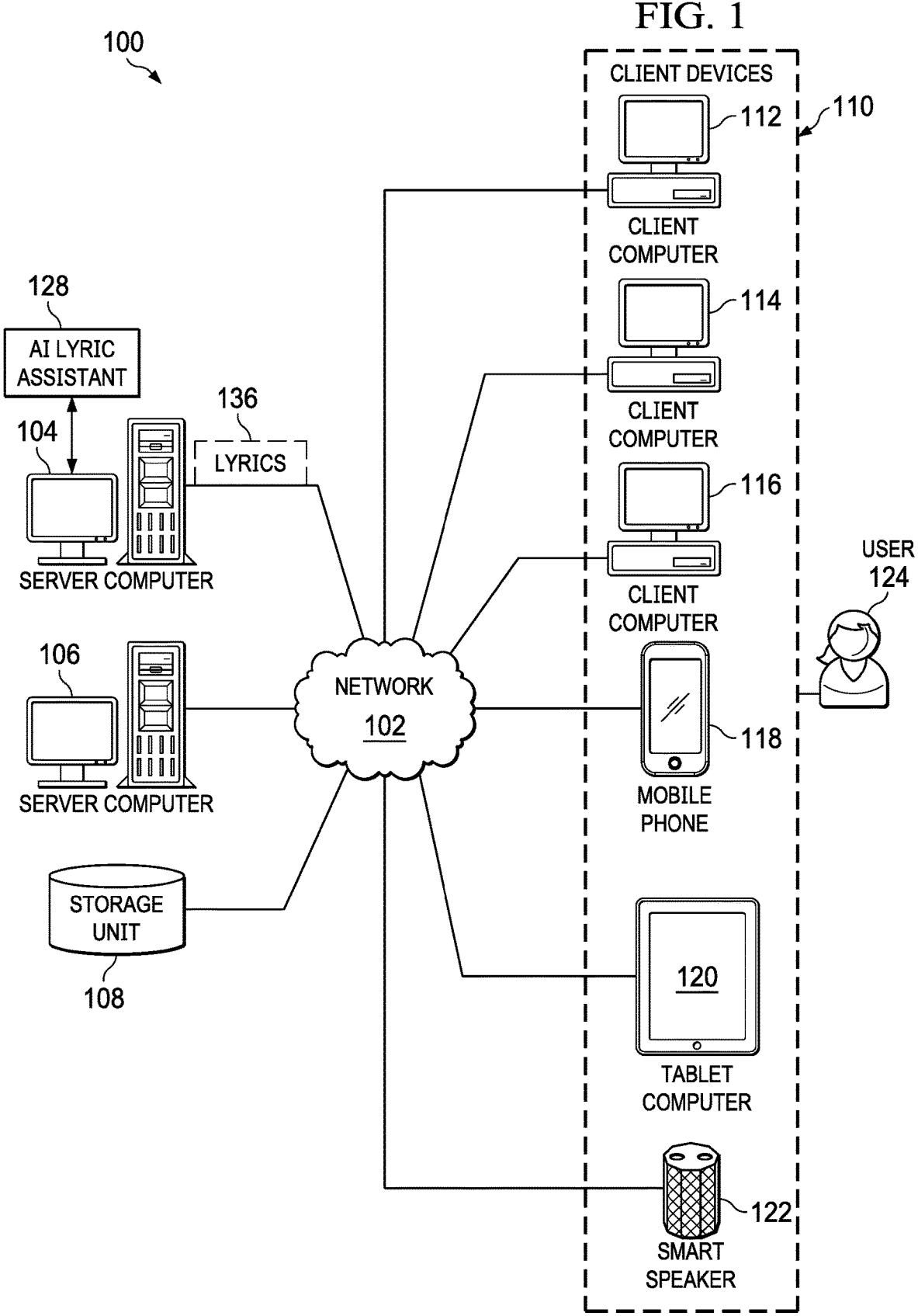
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Creating lyrics ("lyrics" and "words" are used interchangeably throughout) for poetic compositions can sometimes be an arduous and time-consuming process. Often times, authors may have difficulty in finding suitable words that both rhyme and relate in some manner to a theme around which the author is composing. For example, in freestyle rap, the artist is given a theme, perhaps a word, around which the artist is to improvise lyrics to instrumental beats. There are several variations of the problem, but the core challenge is for the artist to imagine words related to or associated with the core theme or word and then improvise lyrics. The process usually proceeds as follows. A theme, a sentence or word, is given to the artist. The artist thinks of words associated with the theme. The artist then thinks of rhyming words to the associated words, not necessarily related to the topic. The artist creates lyrics in sets of two sentences with the first sentence ending in a rhyming word and the second sentence ending in a word associated with the theme. The artist then performs the lyrics reciting the sets of sentences either to instrumental beats or just creating rhythm through the regularly timed recital of the lyrics. The process is arduous for an artist to learn well. In particular, thinking of rhyming words and creating lyrics in sets of two sentences with one sentence ending in a rhyming word and a second sentence ending in an associated word requires a lot of training to avoid convergent thinking where the artist begins to focus on only one aspect or association word of the poetic composition and promptly gets derailed. A system and method that addresses these and other problems would be desirable.

The illustrative embodiments recognize and take into account one or more considerations. For example, the illustrative embodiments recognize and take into account that existing computer implemented methods for generating "new lyrics" for poetic compositions create the lyrics by using or combining lyrics from existing poetic compositions. For example, the illustrative embodiments recognize and take into account that other existing computer implemented methods for generating "new lyrics" generate lyrics based on guess-ahead by analyzing partial text entered by the user to guess what the word may be based on the existing words already in a document.

The illustrative embodiments recognize and take into account that it would be desirable to have a method, an apparatus, a computer system, and a computer program product that determines words that are associated with a theme as well as words that rhyme with the associated words in order to aid an author or composer in creating lyrics for a poetic composition.

In an illustrative embodiment, text taxonomies built dynamically within an artificial intelligence (AI) system are leveraged to explore on-the-fly associations with a central theme or word. The system analyzes these associations in a star schema optimization. Distance from the nexus describes suitability to the given topic. The system then determines words that rhyme with the associated words. In some illustrative embodiments, the rhyming words determined by the lyric assistant are also associated with the theme.

As an example, the assistant has a backend console through which an artist can enter the starting word or theme. The system is capable of self-generating these words or ideas based on an analysis of existing words or lyrics of language models built over vector-spaced corpora and selecting high-value terms.

In some embodiments, a tool is provided to help artists and artists are provided the ability to bootstrap the system. In an illustrative embodiment, the assistant can be incorporated into IBM Watson Beat to provide an artist with additional tools to enhance the artist's creativity.

In an illustrative embodiment, the assistant provides a filtering option that can be used to control the subject area of the content. The filter can be used, for example, to limit the output to holiday related content. As another example, the filter can be used to limit the output content to a specified reading level. For example, the filter can be used to limit the content to an elementary school reading level if the user is trying to create poetic content for elementary school students.

In an illustrative embodiment, the artist is also given the ability to control the word distance in the taxonomies generated using the disclosed lyric assistant. As in the selection of the initial theme, it is possible for this activity to be performed automatically. In an illustrative embodiment, the system is entirely self-contained, but there are these various user hooks in place to allow the artist to step in and take control where appropriate. The selection of distance along the generated star schema directly impacts the associations used in the lyric generation. As the word distance increases, the associations become increasingly non-obvious and often more interesting. For example, an obvious association for the word "banana" might be "fruit" while a non-obvious association or less obvious association might be "tree" or "apple." "Banana" is a type of "fruit" and some "fruits" grow on trees, hence the association between "banana" and "fruit" and an "apple" is also a "fruit" hence the association between "apple" and "banana." An even more non-obvious or less obvious association might be "plant" since a "tree" is a type of "plant." A still more non-obvious association might be "factory" where the word "plant" is associated with "factory" as a synonym. Thus, "banana" and "fruit" may be a single node or step away from each other in a star schema while "factory" may be several nodes or steps away from "banana" in a star schema.

If the user gives an initial theme incorporating multiple words, in an illustrative embodiment, the system will analyze the relationships between these themes and automatically suggest a star-scheme distance metric for the remaining associations. In this method, if the initial conception is non-obvious, the associations will automatically stay true to the selection. The reverse is likewise true.

In an illustrative embodiment, sentiment analysis is used to spin the lyrics in a positive or negative direction. For example, the sentiment analysis can be used to steer the lyrics toward words that have a happy or uplifting connotation. In an illustrative embodiment, the sentiment analysis can analyze the theme to discover a preferred sentiment.

With reference now to the figures and, in particular, with reference to FIG. 1, a pictorial representation of a network of data processing systems is depicted in which illustrative embodiments may be implemented. Network data processing system 100 is a network of computers in which illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Further, client devices 110 can also include other types of client devices such as mobile phone 118, tablet computer 120, and smart speaker 122. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, an artificial intelligence (AI) lyric assistant 128 executes on server computer 104 to assist a user 124 in creating lyrics 136 for a poetic composition. The poetic composition may be, for example, a poem, lyrics to a song, or rap lyrics. AI lyric assistant 128 obtains a them, either from user 124 or auto-generated by AI lyric assistant 128. Based on the them, AI lyric assistant 128 uses a star schema and text taxonomies to determine associated words to the theme and then determines rhyming words to the associated words. Depending on the desires of user 124, the associated words may be more or less obvious depending on a distance from a nexus text determined according to the theme. AI lyric assistant 128 may provide a filter to user 124 allowing user 124 to filter the results of the associated words and rhyming words determined by AI assistant 124 such that the results are limited, for example, to a specific subject area or limited to words that are suitable for a specific reading level. Other types of filtering are also possible. User 124 interacts with AI lyric assistant 128 via one of client devices 110. In an illustrative embodiment, AI lyric assistant 128 may be incorporated into IBM Watson Beat.

Figure 2:
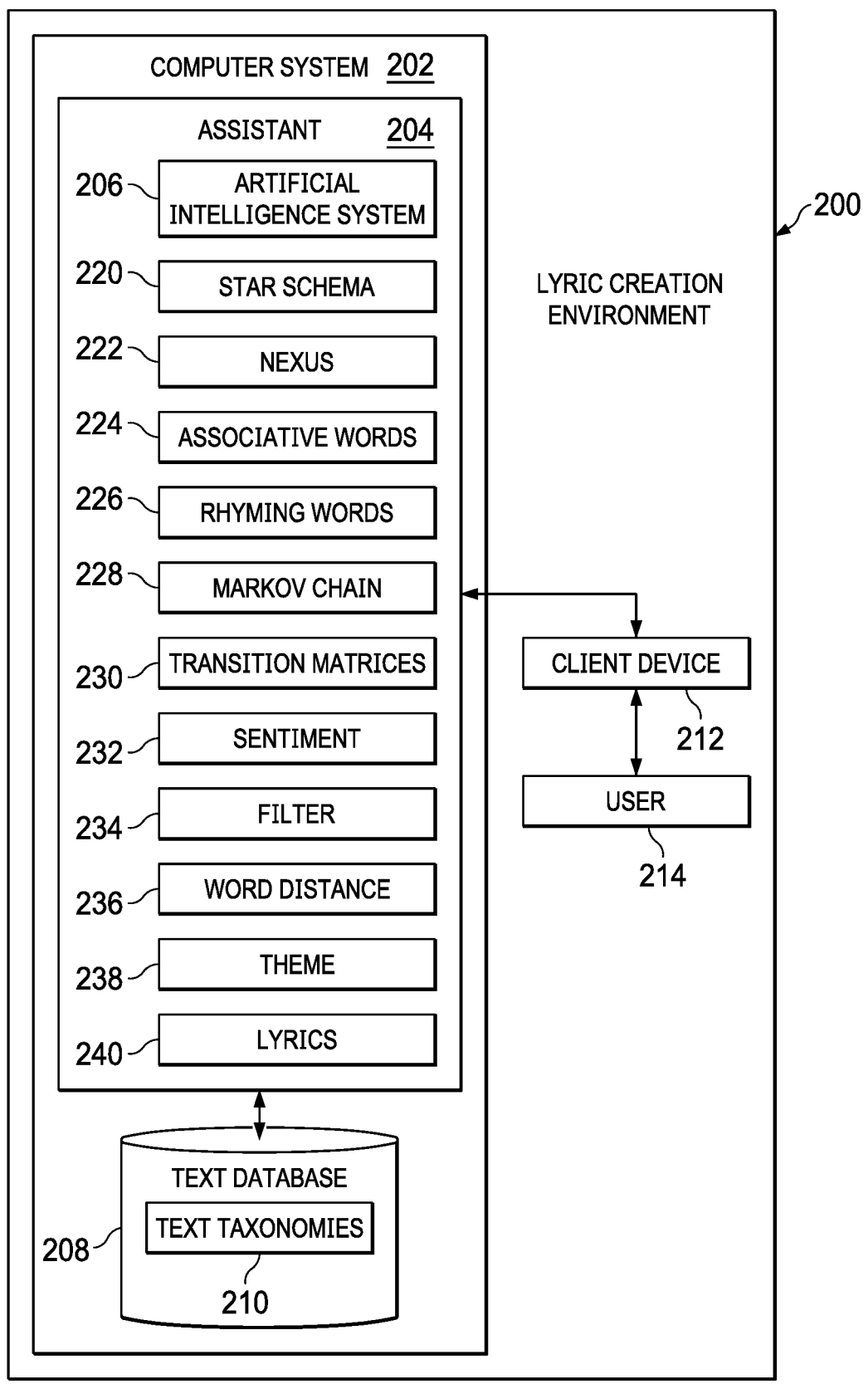
FIG. 2 is a lyric creation environment in accordance with an illustrative embodiment.

Turning now to FIG. 2, a lyric creation environment is depicted in accordance with an illustrative embodiment. Lyric creation environment 200 includes a computer system 202 and a client device 212. Computer system 202 may be implemented as server computer 104 in FIG. 1. Computer system 202 includes an assistant 204 and a text database 208. Assistant 204 may be implemented as AI lyric assistant 128 in FIG. 1. Assistant 204 includes an AI system 206 that may use machine learning, such as neural networks, to aid in creating associative words 224 and rhyming words 226 for a poetic composition. User 214 may interact with assistant 204 through client device 212. Client device may be implemented as, for example, one of client devices 110 in FIG. 1.

Text database 208 includes text taxonomies 210 that may be leveraged to explore on-the-fly associations with a central theme 238 or word. The theme 238 may be a word or phrase supplied by user 214 or may be determined by assistant 204 from context of words or phrases supplied to it by user 214 or from some external source. For example, if a poem, text string, passage from a book, etc. are provided to assistant 204, assistant 204 may determine a theme 238 from the provided text source and the theme 238 used by assistant 204 to create lyrics 240 for a new poetic composition. Assistant 204 analyzes these associations in a star schema 220 optimization where the distance from a nexus 222 describes the suitability to the given topic or theme 238. Assistant 204 determines associative words 224 that are associated with the theme 238 through the star schema 220 analysis. Assistant 204 may then determine rhyming words 226 that rhyme with the associative words 224. In some embodiments, the rhyming words 226 are also determined such that they are also associated with the theme 238 through the star schema 220 analysis.

As an example, assistant 204 has a backend console, such as, client device 212, through which an artist user 214 can enter the starting word or theme 238. Alternatively, assistant 204 self-generates these words or ideas based on, for example, an analysis of existing words or lyrics of language models built over vector-spaced corpora and selecting high-value terms.

Assistant 204 also includes a filter 234 that allows a user 214 to remove some types of words or otherwise tailor the rhyming words 226 and/or associative words 224 to match some criteria of the user 214. For example, the user 214 may wish to limit the associative words 224 and/or the rhyming words 226 to be words that are associated with an environment. As another example, the user 214 may wish to limit the associative words 224 and/or rhyming words 226 to be words associated with holidays. Any number of types of filters 234 may be used in conjunction with the assistant 204 to tailor the output of the assistant 204.

The user 214 is also provided with the ability to control the word distance 236 in the text taxonomies 210. As in the selection of the initial theme, it is possible for this activity to be performed automatically. In an illustrative embodiment, the assistant 204 is entirely self-contained, but there are various user hooks in place to allow the user 214 to step in and take control where appropriate. The selection of word distance 236 along the generated star schema 220 directly impacts the associations used in the lyrics 240 generated by the assistant 204. As the word distance 236 increases, the associations become increasingly non-obvious and often more interesting.

In an illustrative embodiment, if the user 214 provides an initial theme 238 incorporating multiple words, the assistant 204 analyzes the relationships between these words and automatically suggests a star schema 220 word distance 236 metric for the remaining associations. In this embodiment, if the initial conception is non-obvious, the associations will automatically stay true to the selection. The reverse is likewise true. The assistant 204 may also use sentiment 232 analysis to steer the lyrics in a positive or negative direction.

In an illustrative embodiment, the assistant 204 uses dynamically generated and self-organizing taxonomies from text taxonomies 210 in a vector space to generate new lyrics. Assistant 204 may also build and leverage associative differences between words to extend lyrics in either obvious or non-obvious directions. Assistant 204 also uses Markov chains 228 with transition matrices 230 to perform either timed or random associations as the lyrics 240 develop.

Figure 3:
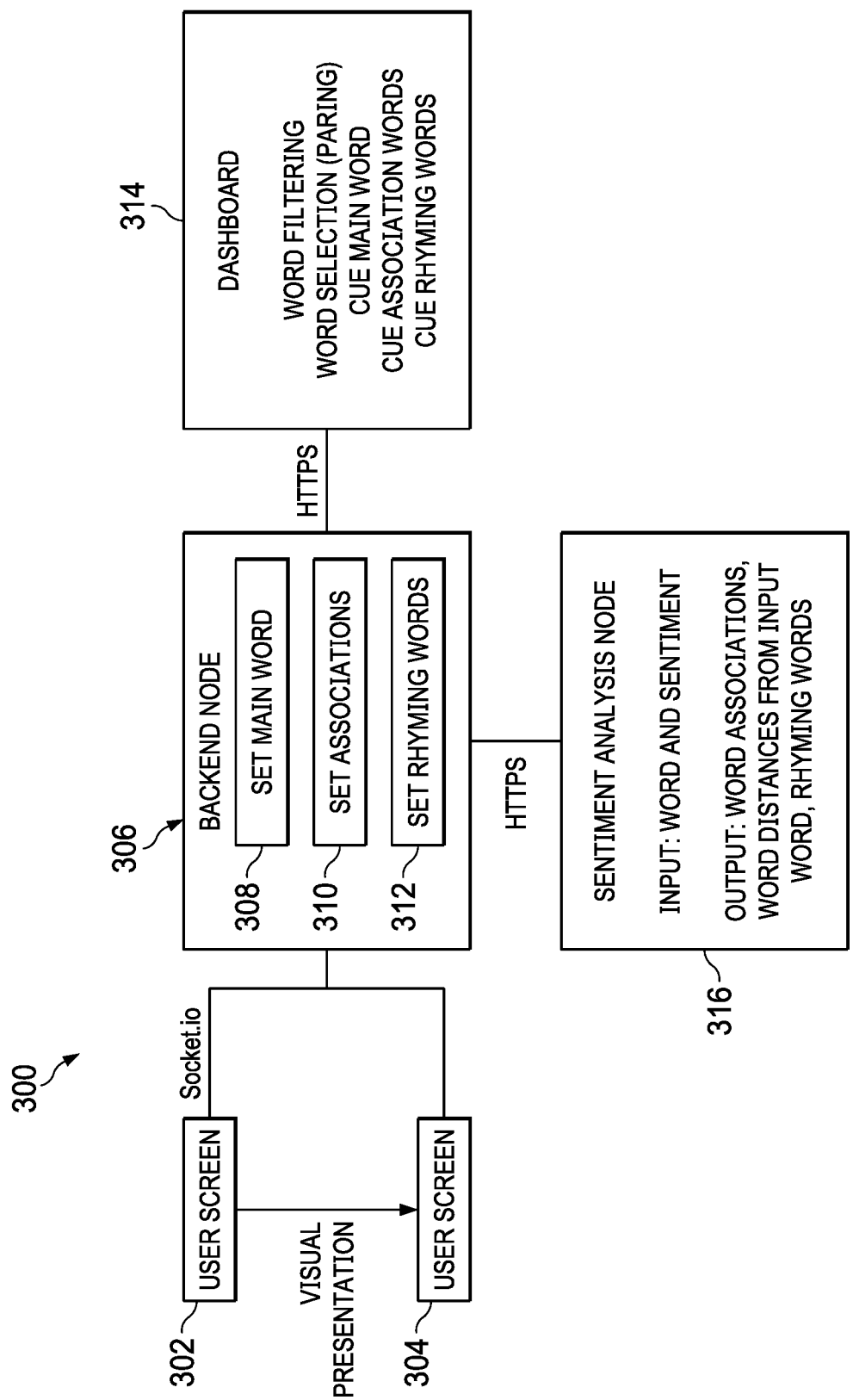
FIG. 3 is a block diagram of a system for determining lyrics in accordance with an illustrative embodiment.

Turning now to FIG. 3, a block diagram of a system for determining lyrics is depicted in accordance with an illustrative embodiment. System 300 may be implemented as lyric creation environment 200 in FIG. 2. System 300 includes a user screens 302, 304, a backend node 306, a dashboard 314 for filtering, and a sentiment analysis node 316 that utilizes machine learning for determining word associations and rhyming words that have a specified sentiment either entered by the user, determined by the system 300 based on the theme, or determined randomly.

The process of generating lyrics starts at user screen 302 where a starting word or theme is supplied by the user, an external source, or is automatically determined by system 300. The theme is then provided to backend node 306. Backend node 306 determines a main word 308, like words 310 that are similar to the main word 308, word associations 310 using text taxonomies such as text taxonomies 210 in FIG. 2, and rhyming words 312. Backend node 306 then creates a user interface and shows the set of associated words and rhyming words to the user in a star-like schema in a visual presentation through user screen 304.

In an illustrative embodiment, the system 300 recursively uses associated words as new themes and on-the-fly generates and shows new associative words that are associated with the new theme. In an embodiment, backend console provides a mechanism for a user to enter a first word or theme (or the first word or theme can be provided automatically by system 300 or generated randomly), and subsequently, backend console 306 selects a new associated word for creation of a new star schema.

Dashboard 314 provides a filtering option that allows unwanted words (e.g., certain words associated with a particular theme or sentiment can be weighted differently). As an example, holiday related words may be more heavily weighted than economic related words. Alternatively, in an example, economic related words may be more heavily weighted than holiday related words.

Utilizing the distance between taxonomies can be utilized to extend the reach of the word association. For example, if the word blue is close to the word sky (distance of 2), but blue is further away from mood (distance 4), then one can set the level of word association to be higher to obtain further associations. This can also be done randomly. This makes the taxonomies used to make the associations more non-obvious and interesting.

Distances and the area between words can be calculated by utilizing a word taxonomy and then further utilized by Markov chains with transition matrices in order to perform either a time (e.g., all associative words are 1-step or 2-steps away) or a random (e.g., all associative words are random steps away up to n).

The system 300 defines a Markov chain state space S and transition matrix P. The state space and matrix are initialized such that i, j ∈ S. State i will communicate with state j if and only if there exists some t such that (P))+, >0 and there exists some u such that (P)),+>0. Under these circumstances the system 300 able to show that the communicating association between two terms ↔ is equivalent. If these terms do not hold, the extent of the difference will define the association of the two terms and their respective degree of obvious vs. non-obviousness in the relationship. The entire sample space S is then partitioned into non-overlapping equivalence classes. The association of false positives is largely prevented by defining states i and j within the same communicating class (across a constrained taxonomy or a graph) if i↔j. When this relationship holds true, each term is accessible from the other (to any degree). When the relationship does not hold true, the terms are not accessible meaning that no degree of relationship could exist; obvious, non-obvious or otherwise.

Therefore, there will be some word that exists as a communication class (i.e., apple) between two sets of words (the matrix of pie and the matrix of computers). This will provide an equivalence relation between the two sets of words, pie (apple, blueberry, custard) and computers (Apple, Lenovo, IBM). Apple is a registered trademark of Apple Corporation. Lenovo is a registered trademark of Lenovo (Beijing) Limited. IBM is a registered trademark of International Business Machines Corporation.

The lyric assistant can take as input a data feed from twitter for most relevant words in order to produce a meaningful word list (i.e., extracts from a certain person like a celebrity or relevant trends in the fashion industry). These starting words can also be derived from the user, a web site such as IMDb in order to have more movie-relevant lyrics, crowd-sourced from a sweep across all social media feeds, or simply imported from a randomly chosen or selected user. IMDb is a registered trademark of IMDb.com, Inc.

Additional inputs such as IoT devices can set the Schema of the poem, whether couplet, freeform, repetitive by the length of the throw of the ball or the number of times bounced. (Think of people at a rock concert passing a balloon around.)

The three areas above (the set of fruit, computers, and founders) determine the initial word seeding such as "apple" and produce additional supersets based on that single word feed. The system 300 then goes on to produce structural elements such as the sets of words for alliteration, rhyming, and length (i.e., number of syllables).

The Schema of the rhyme can be randomly determined, determined from the feeds above (such as via crowdsourcing) or can be determined from the IoT device. These schemas can include the couplet, freeform rap, repetitive rap, or other poetic compositional style. Note that currently, the most popular rap type is internal rhyming, which system 300 can also support.

Figure 4:
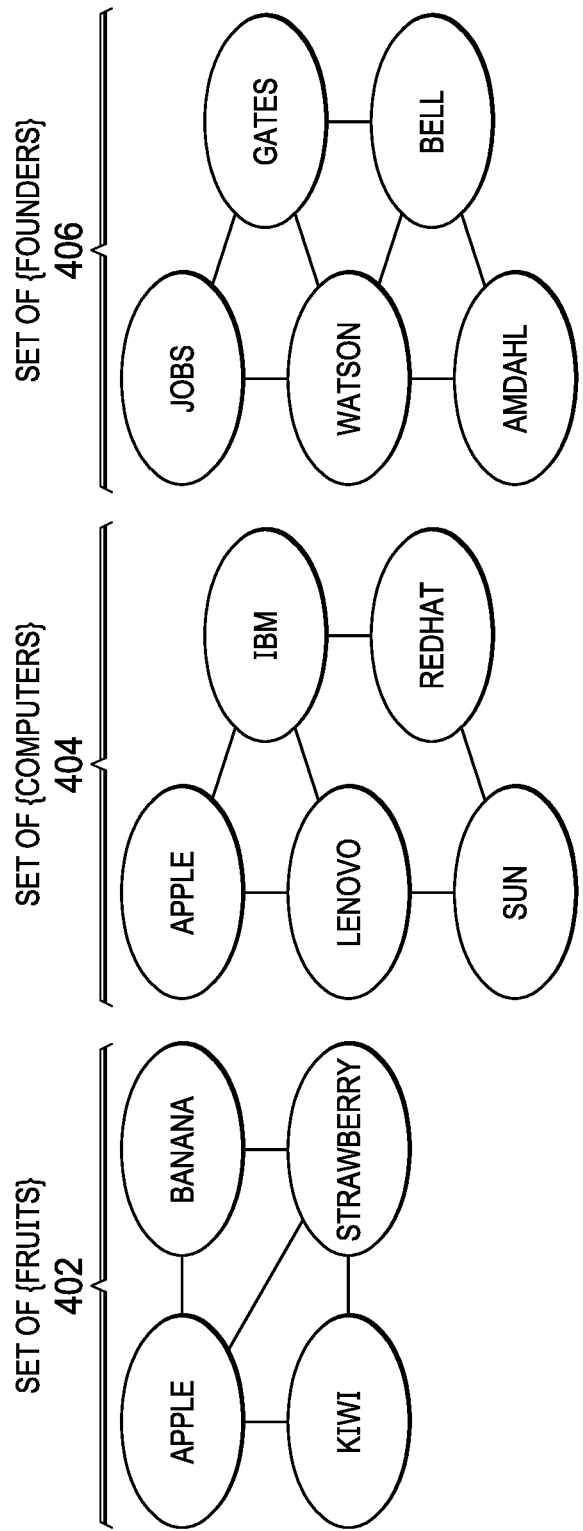
FIG. 4 is a diagram illustrating meta sets in accordance with an illustrative embodiment.

FIG. 4 is a diagram illustrating meta sets in accordance with an illustrative embodiment. In an example, the system 300 may derive various meta-sets from a word. For example, from the word "apple", the system 300 may derive three meta sets: a set of fruit 402, a set of computers 404, and a set of founders 406 shown in FIG. 4. The set of fruit 402 may include apple, banana, kiwi, and strawberry with closeness of associations between the words represented by lines as shown in FIG. 4. The set of computers 404 may include apple, IBM, Lenovo, Sun, and Red Hat with closeness of associations between the words represented by lines as shown in FIG. 4. Sun is a registered trademark of Oracle Corporation. Red Hat is a registered trademark of Red Hat, Inc. The set of founders may include Jobs, Gates, Watson, Bell, and Amdahl with the closeness of associations between the words represented by lines as shown in FIG. 4.

Within this class algebra, the disclosed method to prove the association between two terms is to recursively union the associations of all of the classes immediately below that class in the hierarchy. Since the terms below all inherit the associations of all their parents, the associations inferable to the immediate terms entail:

$$(x \leftrightarrow z) \wedge y = 0 \leftrightarrow (x^o y) \wedge z = 0 \leftrightarrow (z \leftrightarrow y) \wedge x = 0$$

Here two sets are given that are one step away as they share the term "apple", the meta set of fruit and computers. The set of founders denotes a 2nd step away that is linked in a lexographic function (i.e., apple is to Jobs and IBM is to Watson). In this case, the class algebra takes the closure of the first set to add an edge into the IS-A hierarchy for all paths. So we have $$(x \leftrightarrow y) \equiv x! - y \equiv (y \leftrightarrow x)$$

In order to utilize the machine learning methodology, a data stream is needed to practice on. As above, this can be a specific site, a specific person's social media feed, social media feed in a location, etc. Each will produce different results utilizing class calculus with fuzzy sets. This algorithmic approach provides a self-learning mechanism via the sets and supersets described above. More description about machine learning generally is provided below with reference to FIGS. 6-9.

Figure 5:
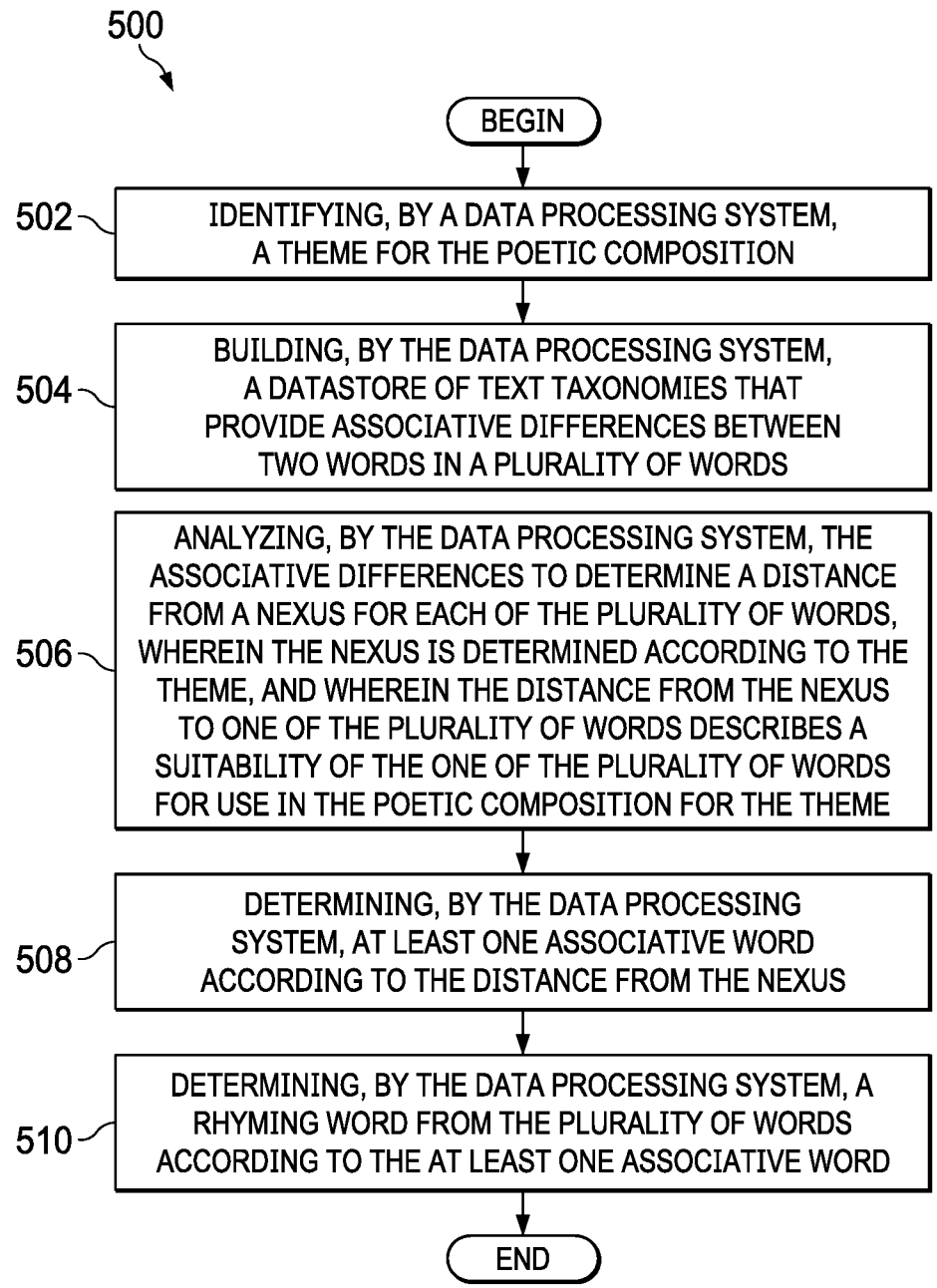
FIG. 5 is a flowchart of a method for determining associative words and rhyming words for a theme of a poetic composition in accordance with an illustrative embodiment.

Turning now to FIG. 5, a flowchart of a method for determining associative words and rhyming words for a theme of a poetic composition is depicted in accordance with an illustrative embodiment. The method 500 begins by identifying, by a data processing system, a theme for the poetic composition (step 502). Identifying the theme for the poetic composition may be performed by, for example, receiving input from a user or randomly determining a theme. Identifying a theme may also be performed according to a history of past themes provided by the user or from the themes of other poetic compositions created by or provided by the user. For example, if the user is fan of a specific author or composer, the user may be interested in themes that are similar to themes utilized by the specific author or composer. In some embodiments, identifying the theme may be performed by a combination of two or more procedures. Next, the method 500 proceeds by building, by the data processing system, a datastore of text taxonomies that provide associative differences between two words in a plurality of words (step 504). Next, the method 500 continues by analyzing, by the data processing system, the associative differences to determine a distance from a nexus for each of the plurality of words, wherein the nexus is determined according to the theme, and wherein the distance from the nexus to one of the plurality of words describes a suitability of the one of the plurality of words for use in the poetic composition for the theme (step 506). In an illustrative embodiment, the nexus is a word or phrase that is determined to be the theme. In an illustrative embodiment, analyzing the associative differences to determine a distance from the nexus includes analyzing the associative differences according to a star schema optimization. In an illustrative embodiment, identifying the theme includes one of receiving input from a user and randomly determining a theme. In another illustrative embodiment, the theme is determined according to a history of past themes provided by a user.

Next, method 500 proceeds by determining, by the data processing system, at least one associative word according to the distance from the nexus (step 508). Next, the method 500 proceeds by determining, by the data processing system, a rhyming word from the plurality of words according to the at least one associative word (step 510), after which, method 500 may end. In an illustrative embodiment, at least one of the rhyming words and the associative words are determined according to Markov chains and transition matrices. In an illustrative embodiment, the method 500 also includes receiving, by the data processing system, a filter input from a user, wherein the determining the at least one associative word and/or the rhyming word is determined according to the filter input. As discussed above with reference to FIG. 2, the filter input allows a user to remove some types of words or otherwise tailor the rhyming and/or associative words to match some criteria of the user. For example, the user may wish to limit the associative words and/or the rhyming words to be words that are associated with an urban environment. As another example, the user may wish to limit the associative words and/or rhyming words to be words associated with holidays.

In an embodiment, the method 500 also includes, receiving, by the data processing system, a word distance limitation, wherein the word distance limitation comprises a rule regarding a distance of the at least one associative word from the nexus, and wherein the determining the at least one associative word is determined according to the word distance limitation. The word distance limitation may include at least one of a maximum distance from the nexus and a minimum distance from the nexus Turning now to a discussion of embodiments of machine learning in which one or more aspects of the illustrative embodiments may be implemented, there are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 6:
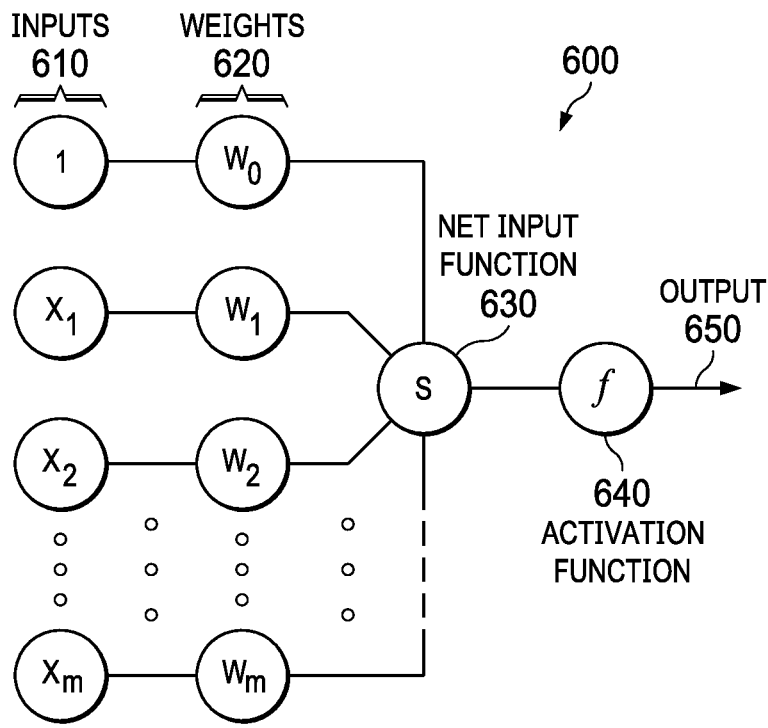
FIG. 6 is a diagram that illustrates a node in a neural network in which illustrative embodiments can be implemented.

FIG. 6 is a diagram that illustrates a node in a neural network in which illustrative embodiments can be implemented. Node 600 combines multiple inputs 610 from other nodes. Each input 610 is multiplied by a respective weight 620 that either amplifies or dampens that input, thereby assigning significance to each input for the task the algorithm is trying to learn. The weighted inputs are collected by a net input function 630 and then passed through an activation function 640 to determine the output 650. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Stochastic neural networks are a type of network that incorporate random variables, which makes them well suited for optimization problems. This is done by giving the nodes in the network stochastic (randomly determined) weights or transfer functions. A Boltzmann machine is a type of stochastic neural network in which each node is binary valued, and the chance of it firing depends on the other nodes in the network. Each node is a locus of computation that processes an input and begins by making stochastic decisions about whether to transmit that input or not. The weights (coefficients) that modify inputs are randomly initialized.

Boltzmann machines optimize weights and quantities and are particularly well suited to represent and solve difficult combinatorial problems. To solve a learning problem, a Boltzmann machine is shown a set of binary data vectors and must find weights on the connections so that the data vectors are good solutions to the optimization problem defined by those weights.

Figure 7:
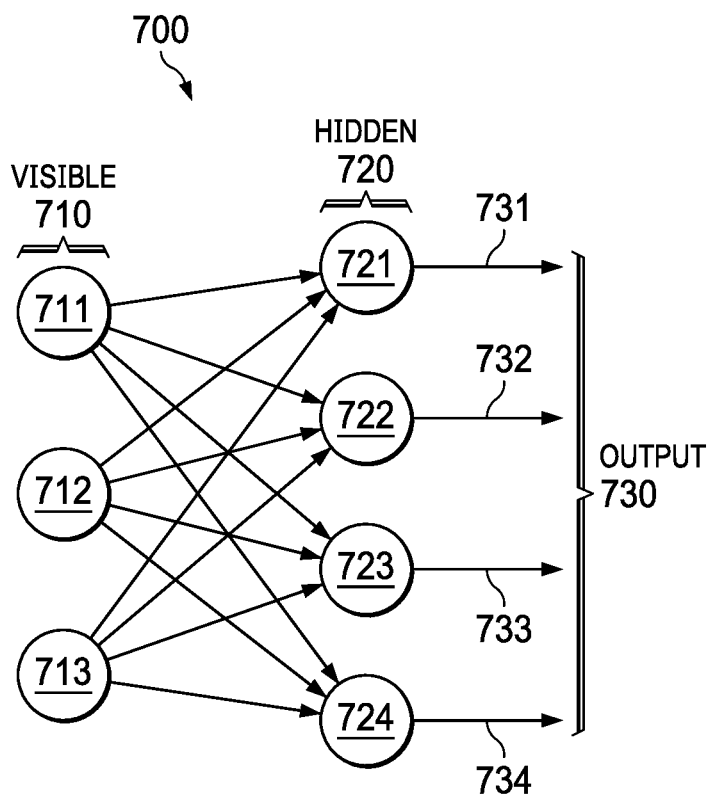
FIG. 7 is a diagram illustrating a restricted Boltzmann machine in which illustrative embodiments can be implemented.

FIG. 7 is a diagram illustrating a restricted Boltzmann machine in which illustrative embodiments can be implemented. As shown in FIG. 7, the nodes in the Boltzmann machine 700 are divided into a layer of visible nodes 710 and a layer of hidden nodes 720. A common problem with general Boltzmann machines is that they stop learning correctly when they are scaled up. Restricted Boltzmann machines (RBMs) overcome this problem by using an architecture that does not allow connections between nodes in the same layer. As can be seen in FIG. 7, there is no intralayer communication between nodes.

The visible nodes 710 are those that receive information from the environment (i.e. a set of external training data). Each visible node in layer 710 takes a low-level feature from an item in the dataset and passes it to the hidden nodes in the next layer 720. When a node in the hidden layer 720 receives an input value x from a visible node in layer 710 it multiplies x by the weight assigned to that connection (edge) and adds it to a bias b. The result of these two operations is then fed into an activation function which produces the node's output.

In symmetric networks such as Boltzmann machine 700, each node in one layer is connected to every node in the next layer. For example, when node 721 receives input from all of the visible nodes 711-713 each x value from the separate nodes is multiplied by its respective weight, and all of the products are summed. The summed products are then added to the hidden layer bias, and the result is passed through the activation function to produce output 731. A similar process is repeated at hidden nodes 722-724 to produce respective outputs 732-734. In the case of a deeper neural network (discussed below), the outputs 730 of hidden layer 720 serve as inputs to the next hidden layer.

Training a Boltzmann machine occurs in two alternating phases. The first phase is the "positive" phase in which the visible nodes' states are clamped to a particular binary state vector sampled from the training set (i.e. the network observes the training data). The second phase is the "negative" phase in which none of the nodes have their state determined by external data, and the network is allowed to run freely (i.e. the network tries to reconstruct the input). In the negative reconstruction phase the activations of the hidden layer 720 act as the inputs in a backward pass to visible layer 710. The activations are multiplied by the same weights that the visible layer inputs were on the forward pass. At each visible node 711-713 the sum of those products is added to a visible-layer bias. The output of those operations is a reconstruction r (i.e. an approximation of the original input x).

On the forward pass, the RBM uses inputs to make predictions about node activations (i.e. the probability of output given a weighted input x). On the backward pass, the RBM is attempting to estimate the probability of inputs x given activations a, which are weighted with the same coefficients as those used on the forward pass. The bias of the hidden layer helps the RBM to produce activations on the forward pass. Biases impose a floor so that at least some nodes fire no matter how sparse the input data. The visible layer bias helps the RBM learn the reconstructions on the backward pass.

Because the weights of the RBM are randomly initialized the difference between the reconstructions and the original inputs is often large. That error is then backpropagated against the RBM's weights in an iterative learning process, and the weights are adjusted until an error minimum is reached.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks can be stacked to created deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

Figure 8:
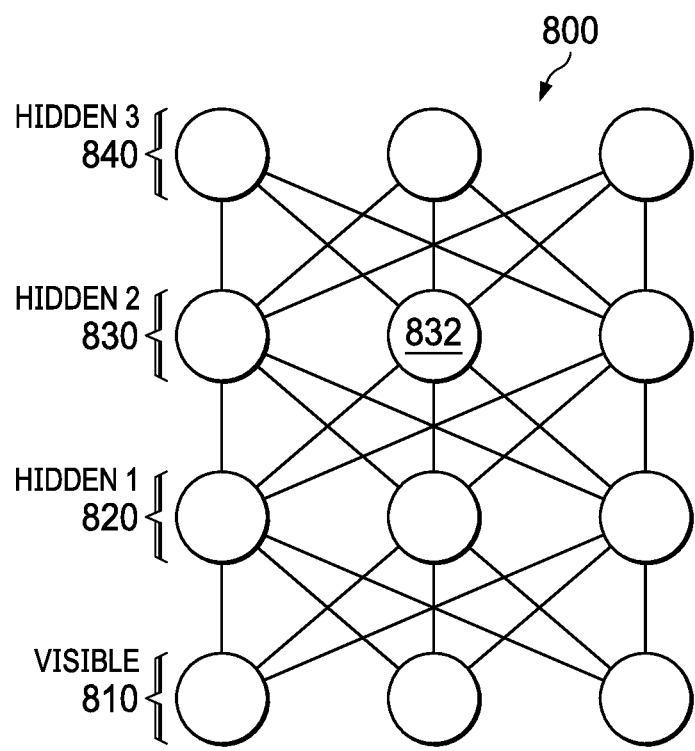
FIG. 8 is a diagram illustrating a Deep Boltzmann machine in which illustrative embodiments can be implemented.

FIG. 8 is a diagram illustrating a Deep Boltzmann machine in which illustrative embodiments can be implemented. A Deep Boltzmann machine (DBM) is a network of symmetrically coupled stochastic binary nodes, comprising a layer of visible nodes 810 and multiple layers of hidden nodes 820-840. Like RBMs, the Deep Boltzmann machine 800 has no connections between nodes in the same layer. It should be understood that the number of nodes and layers depicted in FIG. 8 is chosen merely for ease of illustration and that the present disclosure can be implemented using more or less nodes and layers that those shown.

DBMs learn the hierarchical structure of features, wherein each subsequent layer in the DBM processes more complex features than the layer below it. For example, in FIG. 8, the first hidden layer 820 might process low-level features, such as, e.g., the edges of an image. The next hidden layer up 830 would process higher-level features, e.g., combinations of edges, and so on. This process continues up the layers, learning simpler representations and then composing more complex ones.

The DBM is created by first separately pre-training each RBM in a stack and then combining them to form a single DBM. A key characteristic of DBMs is that all of the connections between the layers are undirected, as depicted in FIG. 8, meaning signals can travel in both directions between nodes and layers. This undirected architecture allows the DBM 800 to apply inference and learning procedures using both bottom-up and top-down passes, thereby producing dependencies between hidden variables in both directions, not just from the layers below. For example, in FIG. 8, the state of hidden variable 832 is dependent on the states of the hidden variables in both layers 820 and 840. This allows the DBM to handle uncertainty more effectively than other deep networks that rely solely on bottom-up, feed forward learning.

In bottom-up sequential learning, the weights are adjusted at each new hidden layer until that layer is able to approximate the input from the previous lower layer. In contrast, the undirected architecture of DBMs allows the joint optimization of all levels, rather than sequentially up the layers of the stack.

DBMs perform well in many application domains. They are capable of fast inference in a fraction of a second, and learning can scale to millions of examples.

Another type of neural network that more closely simulates the functioning of biological systems is a Spiking Neural Network (SNN). SNNs incorporate the concept of time into their operating model. One of the most important differences between SNNs and other types of neural networks is the way information propagates between units/nodes.

Whereas other types of neural networks communicate using continuous activation values, communication in SNNs is done by broadcasting trains of action potentials, known as spike trains. In biological systems, a spike is generated when the sum of changes in a neuron's membrane potential resulting from pre-synaptic stimulation crosses a threshold. This principle is simulated in artificial SNNs in the form of a signal accumulator that fires when a certain type of input surpasses a threshold. The intermittent occurrence of spikes gives SNNs the advantage of much lower energy consumption than other types of neural networks. A synapse can be either excitatory (i.e. increases membrane potential) or inhibitory (i.e. decreases membrane potential). The strength of the synapses (weights) can be changed as a result of learning.

Information in SNNs is conveyed by spike timing, including latencies and spike rates. SNNs allow learning (weight modification) that depends on the relative timing of spikes between pairs of directly connected nodes. Under the learning rule known as spike-timing-dependent plasticity (STDP) the weight connecting pre- and post-synaptic units is adjusted according to their relative spike times within a specified time interval. If a pre-synaptic unit fires before the post-synaptic unit within the specified time interval, the weight connecting them is increased (long-term potentiation (LTP)). If it fires after the post-synaptic unit within the time interval, the weight is decreased (long-term depression (LTD)).

The leaky integrate-and-fire (LIF) neuron has been a primary area of interest for the development of an artificial neuron and is a modified version of the original integrate-and-fire circuit. The LIF neuron is based on the biological neuron, which exhibits the following functionalities:

1) Integration: Accumulation of a series of input spikes,
2) Leaking: Leaking of the accumulated signal over time when no input is provided, and
3) Firing: Emission of an output spike when the accumulated signal reaches a certain level after a series of integration and leaking.

An LIF neuron continually integrates the energy provided by inputs until a threshold is reached and the neuron fires as a spike that provides input to other neurons via synapse connections. By emitting this spike, the neuron is returned to a low energy state and continues to integrate input current until its next firing. Throughout this process, the energy stored in the neuron continually leaks. If insufficient input is provided within a specified time frame, the neuron gradually reverts to a low energy state. This prevents the neuron from indefinitely retaining energy, which would not match the behavior of biological neurons.

Lateral inhibition is a process that allows an excited neuron to inhibit, or reduce, the activity of other nearby or connected neurons. One such neural computing system that seeks to take advantage of this is the winner-take-all system. As a form of competitive learning, artificial neurons contend for activation, meaning that only one neuron is chosen as the winner and allowed to fire, using lateral inhibition to suppress the output of all other neurons. After the winning neuron fires, the system is reset and the neurons once again compete for activation. A winner-take-all system is one of the many machine learning paradigms that take advantage of the lateral inhibition phenomenon, which is commonly used in recognition and modeling processes.

Figure 9:
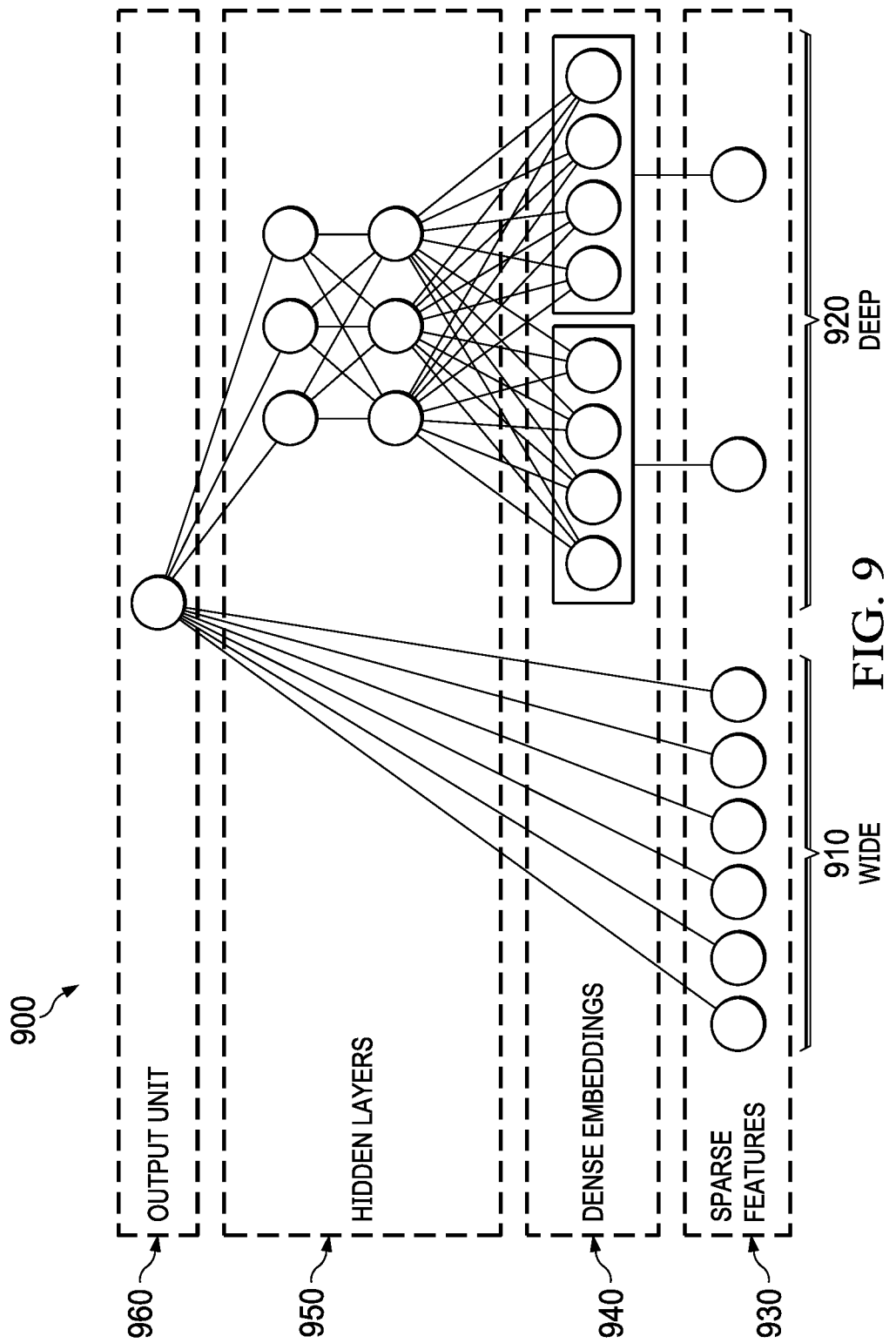
FIG. 9 is a diagram illustrating a wide-and-deep neural network in which illustrative embodiments can be implemented.

FIG. 9 is a diagram illustrating a wide-and-deep neural network in which illustrative embodiments can be implemented. Wide-and-deep model 900 comprises two main parts, a wide linear part 910 and a deep part 920. Wide part 910 is responsible for learning and memorizing the co-occurrence of particular dimensions within a data set. Deep part 920 learns complex relationships among individual dimensions in the data set. Stated more simply, deep part 920 develops general rules about the data set, and wide part 910 memorizes exceptions to those rules.

Wide-and-deep model 900 comprises a plurality of layers. The first two layers comprise sparse features 930 and dense embeddings 940. Features refer to properties of a phenomenon being modelled that are considered to have some predictive quality. Sparse features 930 comprise features with mostly zero values. Sparse feature vectors represent specific instantiations of general features can could have thousands or even millions of possible values, hence why most of the values in the vector are zeros. For example, a vocabulary might have a vast number of words, and each word is represented by a large vector comprised mostly of zero values. For a given word, the number of dimensions in the vector equals the number of words in the vocabulary, and the dimension representing the word within the vocabulary has a value of 1, and the remaining dimensions (representing the other words) have a value of zero.

The wide part 910 of the wide-and-deep model 900 learns using these sparse features 930, which is why it is able to remember specific instances and exceptions.

Dense embeddings 940, in contrast, comprise mostly non-zero values. An embedding is a dense, relatively low-dimensional vector space into which high-dimension sparse vectors can be translated. Embedding making machine learning easier to do on large inputs like sparse vectors representing words. In a dense embedding, words are represented by dense vectors, wherein the vector represents the projection of the word into a continuous vector space. Individual dimensions in these vectors typically have no inherent meaning, but rather it is the pattern of location and distance between vectors that machine learning uses. The position of a word within the vector space is learned from context and is based on the words that surround it when used.

Ideally, dense embeddings capture semantics of the input by placing semantically similar inputs close together in the embedding space. It is from these semantics that the deep part of 920 of the wide-and-deep model 900 is able to generalize rules about the input values. The deep embeddings 940 mapped from the spare features 910 serves as inputs to the hidden layers 950 of the deep part 920.

Left to itself, the wide part 910 would overfit predictions by learning the specific instances represented in the sparse features 930. Conversely, by itself the deep part 920 would over generalize from the dense embeddings 940, producing rules that are over or under inclusive in their predictions. Therefore, the wide-and-deep model 900 trains both parts concurrently by feeding them both into a common output unit 960. During learning, the value of output unit 960 is back propagated back through both the wide part 910 and deep part 920 as described above. The end result is a model that can accurately predict results from general rules while able to account for specific exceptions to those rules.

Figure 10:
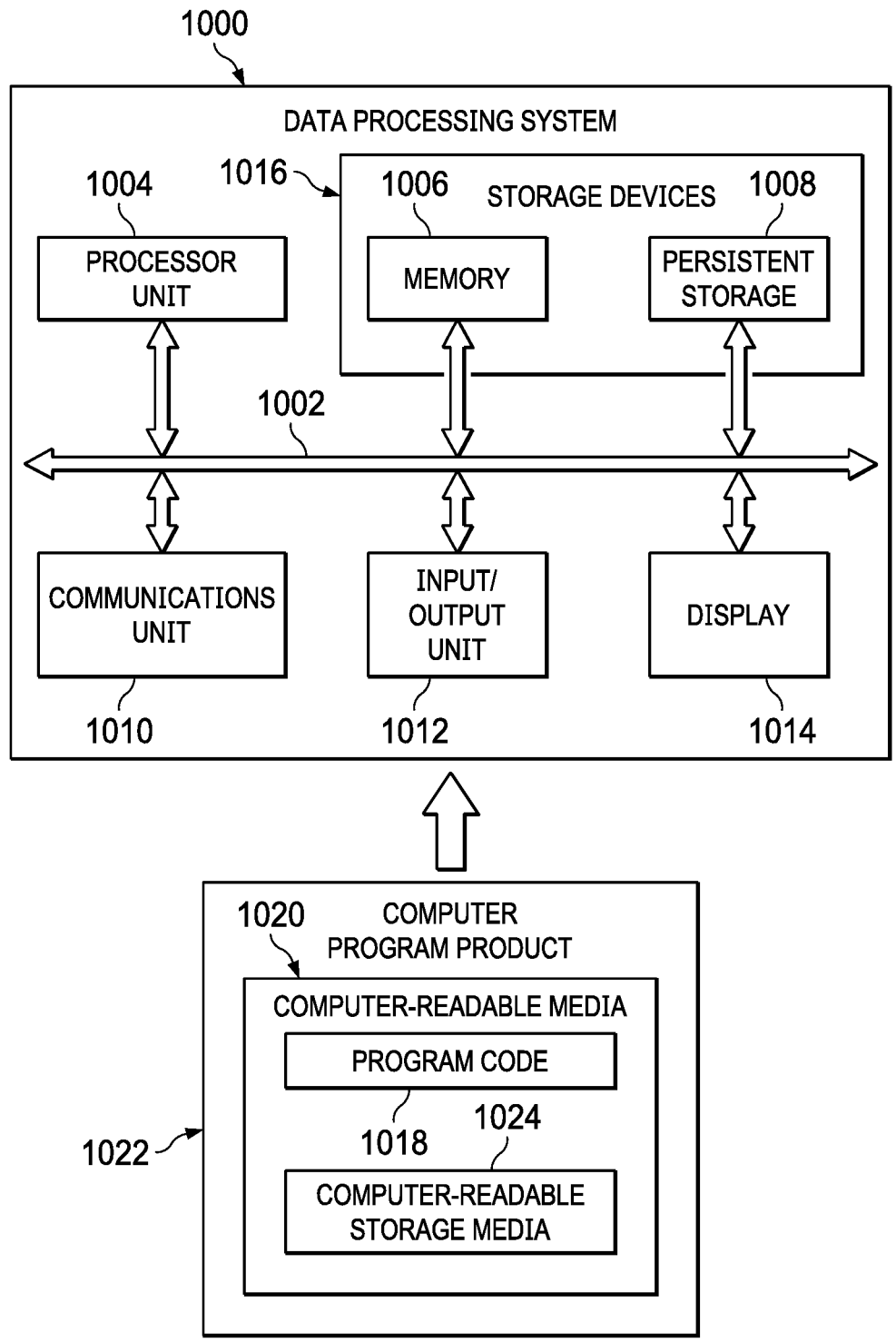
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement server computer 104, server computer 106, and/or one or more of client devices 110, in FIG. 1. Data processing system 1000 can also be used to implement computer system 202 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, illustrative embodiments of the present invention provide a computer implemented method, computer system, and computer program product for generating lyrics for poetic compositions. The method determines a theme randomly or from input and, from the theme, the method determines words that are associated with the theme and words that rhyme with the associated words according to a star schema approach. The method provides a filter and other mechanisms to tailor the output to fit a specified sentiment, topic, or other feature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method, comprising:
   identifying, by a data processing system, a theme for the poetic composition;
   building, by the data processing system, a datastore of text taxonomies that provide associative differences between two words in a plurality of words;
   analyzing, by the data processing system, the associative differences to determine a distance from a nexus for each of the plurality of words, wherein the nexus is determined according to the theme, and wherein the distance from the nexus to one of the plurality of words describes a suitability of the one of the plurality of words for use in the poetic composition for the theme;
   determining, by the data processing system, at least one associative word according to the distance from the nexus; and
   determining, by the data processing system, a rhyming word from the plurality of words according to the at least one associative word.

2. The method of claim 1, wherein analyzing the associative differences to determine the distance from the nexus comprises analyzing the associative differences according to a star schema optimization.

3. The method of claim 1, wherein identifying the theme comprises one of receiving input from a user and randomly determining the theme.

4. The method of claim 1, wherein identifying the theme comprises determining the theme according to a history of past themes provided by the user.

5. The method of claim 1, wherein determining at least one of the rhyming word and the associative word is determined according to Markov chains and transition matrices.

6. The method of claim 1, further comprising:
   receiving, by the data processing system, a filter input from the user, wherein the determining the at least one associative word is determined according to the filter input.

7. The method of claim 1, further comprising:
   receiving, by the data processing system, the filter input from the user, wherein the determining the rhyming word is determined according to the filter input.

8. The method of claim 1, further comprising:
   receiving, by the data processing system, a word distance limitation, wherein the word distance limitation comprises a rule regarding the distance of the at least one associative word from the nexus, and wherein the determining the at least one associative word is determined according to the word distance limitation.

9. The method of claim 8, wherein the word distance limitation comprises at least one of a maximum distance from the nexus and a minimum distance from the nexus.

10. A computer system comprising:
    a bus system;
    a storage device connected to the bus system, wherein the storage device stores program instructions; and
    a processor connected to the bus system, wherein the processor executes the program instructions to:
    identify a theme for the poetic composition;
    build a datastore of text taxonomies that provide associative differences between two words in a plurality of words;
    analyze the associative differences to determine a distance from a nexus for each of the plurality of words, wherein the nexus is determined according to the theme, and wherein the distance from the nexus to one of the plurality of words describes a suitability of the one of the plurality of words for use in the poetic composition for the theme;
    determine at least one associative word according to the distance from the nexus; and
    determine a rhyming word from the plurality of words according to the at least one associative word.

11. The computer system of claim 10, wherein the program instructions to analyze the associative differences to determine the distance from the nexus comprises program instructions to analyze the associative differences according to a star schema optimization.

12. The computer system of claim 10, wherein the processor further executes the program instructions to:
    receive a filter input from a user, wherein the program instructions to determine the at least one associative word comprises program instructions to determine the at least one associative word according to the filter input.

13. The computer system of claim 10, wherein the processor further executes the program instructions to:
    receive the filter input from the user, wherein the program instructions to determine the rhyming word comprises program instructions to determine the rhyming word according to the filter input.

14. The computer system of claim 10, wherein the processor further executes the program instructions to:
    receive a word distance limitation, wherein the word distance limitation comprises a rule regarding the distance of the at least one associative word from the nexus, and wherein the program instructions to determine the at least one associative word comprises program instructions to determine the at least one associative word according to the word distance limitation.

15. A computer program product comprising a computer readable storage medium having program instructions embodied therewith, the program instructions executable by a computer to cause the computer to perform a method comprising:
    identifying a theme for the poetic composition;
    building a datastore of text taxonomies that provide associative differences between two words in a plurality of words;
    analyzing the associative differences to determine a distance from a nexus for each of the plurality of words, wherein the nexus is determined according to the theme, and wherein the distance from the nexus to one of the plurality of words describes a suitability of the one of the plurality of words for use in the poetic composition for the theme;
    determining at least one associative word according to the distance from the nexus; and
    determining a rhyming word from the plurality of words according to the at least one associative word.

16. The computer program product of claim 15, wherein the analyzing the associative differences to determine the distance from the nexus comprises analyzing the associative differences according to a star schema optimization.

17. The computer program product of claim 15, wherein the method further comprises:
    receiving a filter input from a user, wherein the determining the at least one associative word is determined according to the filter input.

18. The computer program product of claim 15, wherein the method further comprises:

receiving the filter input from the user, wherein the determining the rhyming word is determined according to the filter input.

19. The computer program product of claim 15, wherein the method further comprises:

receiving a word distance limitation, wherein the word distance limitation comprises a rule regarding the distance of the at least one associative word from the nexus, and wherein the determining the at least one associative word is determined according to the word distance limitation.

20. The computer program product of claim 19, wherein the word distance limitation comprises at least one of a maximum distance from the nexus and a minimum distance from the nexus.

* * * * *